Figure 1:
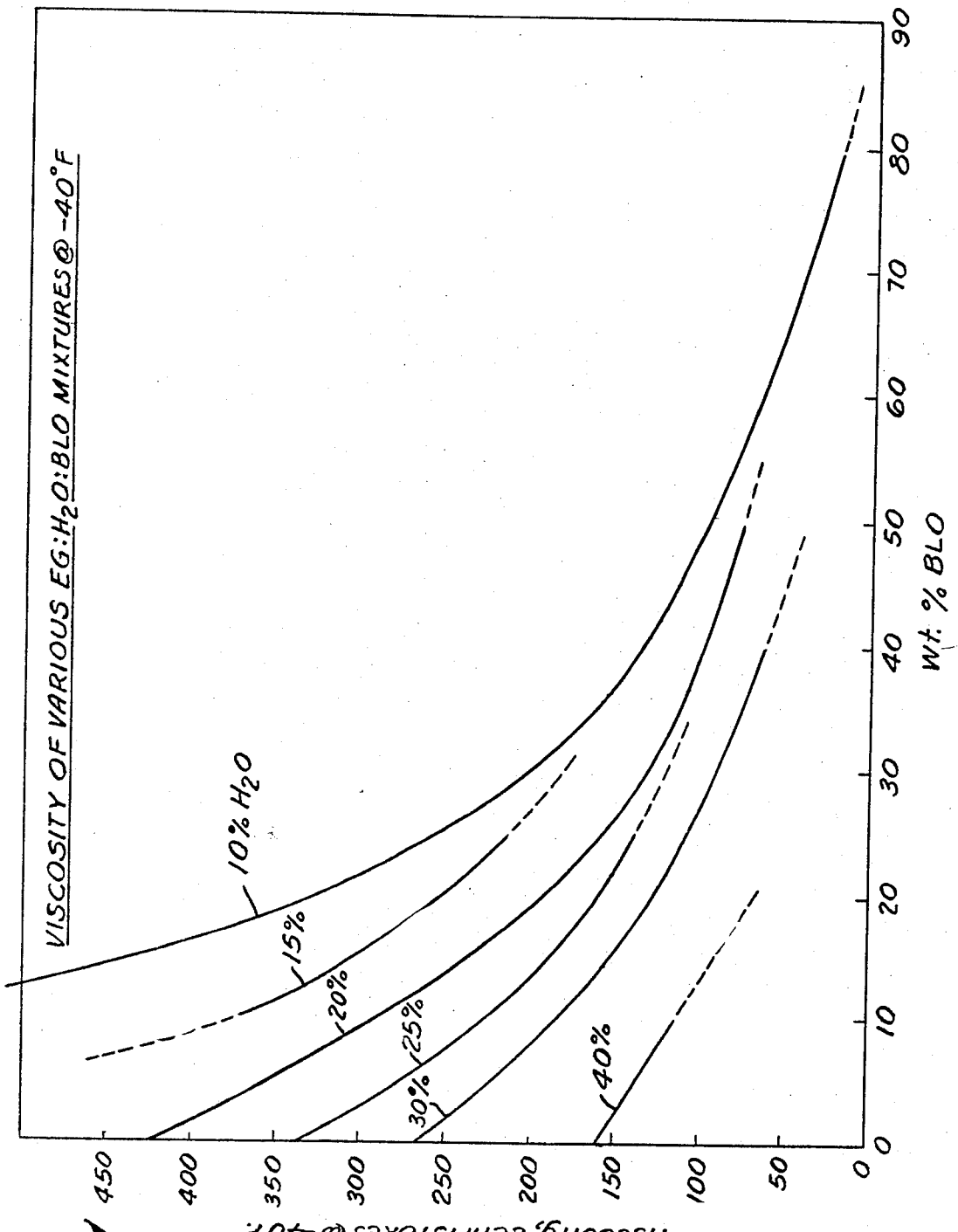

United States Patent [19]
Arnold et al.

[11] 3,857,686

[45] Dec. 31, 1974

[54] GLYCOL-BUTYROLACTONE MIXTURES

[75] Inventors: John L. Arnold; Roscoe L. Pearce, both of Midland, Mich.

[73] Assignee: The Dow Chemical Company, Midland, Mich.

[22] Filed: Feb. 8, 1971

[21] Appl. No.: 113,164

[52] U.S. Cl............................ 55/29, 55/32, 55/80, 55/82, 62/18, 62/20, 252/70, 252/79, 260/676 H
[51] Int. Cl............................................ B01d 53/02
[58] Field of Search ............ 252/79, 76, 70; 55/80, 55/82, 29, 32; 260/676 H; 62/18, 20

[56] References Cited
UNITED STATES PATENTS

| | | | |
|---|---|---|---|
| 2,862,444 | 12/1958 | Drautz............................. | 101/149.4 |
| 2,905,642 | 9/1959 | Miller et al........................ | 252/73 |
| 2,961,798 | 11/1960 | Wells................................ | 252/70 X |
| 3,351,823 | 11/1967 | Jenny............................... | 252/62.2 X |

Primary Examiner—Mayer Weinblatt
Assistant Examiner—Harris A. Pitlick
Attorney, Agent, or Firm—Stephen Hoynak

[57] ABSTRACT

The low temperature viscosity, freeze point depression and hydrocarbon hydrate formation depression characteristics of glycols are improved by replacing some of the glycol with butyrolactone. The mixture finds utility as a heat transfer medium and in natural gas processing.

4 Claims, 2 Drawing Figures

GLYCOL-BUTYROLACTONE MIXTURES

BACKGROUND OF THE INVENTION

Glycols, especially ethylene glycol, have many utilities associated with their ability to depress the freezing point of water and to prevent the formation of organic hydrates. It is well known, for example, that aqueous solutions of ethylene glycol are used as heat transfer media in, for instance, internal combustion engines, said solutions having a lower freezing point than water.

Glycols also find utility in the gas processing industry. Many natural gas streams are "wet" with liquid hydrocarbons which can easily be recovered merely by cooling the gas to cause the less volatile liquefiable hydrocarbons to condense. During the cooling process, however, hydrocarbon hydrates form, blocking off the heat-exchanger tubes. Such hydrates are generally crystalline compounds similar in appearance to snow or frost, being composed of 7 to 54 molecules of water surrounding, and associated with, one molecule of hydrocarbon, such as methane, ethane or propane. Since the presence of water is the primary problem, the simplest method for preventing hydrate formation is to introduce a hygroscopic compound to the system to dissolve the water when it condenses.

Any hygroscopic organic solvent can be used; however, for practical reasons, it should be relatively nonvolatile and thermally stable to permit boiling off the excess water so that the compound may be used again. Also, the molecular weight should be low. Of course, it should also possess a low order of solubility in the desired liquefied hydrocarbons.

Early in the development of the above technique, methanol, $CaCl_2$, ammonia and glycols were considered as hydrate inhibitors. Due to some problems with the others, ethylene glycol evolved as the primary compound for this application.

Aqueous ethylene glycol works well down to about $-30°F.$, but below that difficulties have been encountered due to its viscosity. At $-40°F.$ the viscosity of aqueous ethylene glycol is so high as to render it virtually immobile.

Thus, the primary problem of trying to operate a low temperature hydrocarbon recovery facility utilizing ethylene glycol as a hydrate inhibitor is the gradual buildup, or increased inventory, of ethylene glycol in the tubes, necessitating a shut-down to permit warming of the chiller to facilitate drainage of the aqueous glycol solution. This has to be repeated each and every time the pressure drop across the chiller exceeds some specific limiting value. Excessive liquid inventory results in restricted gas flow, producing higher gas velocities in the partially flooded tubes with the end result that copious quantities of the condensate liquid are scooped up and intermixed with the gas to the extent that it forms a very stable emulsion quite similar in appearance to an aerosol shaving cream lather. This tight emulsion does not separate readily, and cross-contamination or entrainment results.

SUMMARY OF THE INVENTION

It has now been found that mixtures of butyrolactone (BLO) with glycols, or aqueous mixtures of glycols, exhibit better low temperature viscosity characteristics, freeze point depression and/or hydrate formation depression than glycols alone.

More particularly, a mixture of about 5 to 95 weight percent of one or more glycols and about 95 to 5 weight percent of BLO is suitable for use in lieu of glycol alone. A preferred composition is a mixture of about 40 to 90 weight percent of glycol and 10 to 60 weight percent of BLO. Aqueous solutions of one or more glycols and BLO are also useful, up to about 50 weight percent water being suitable.

For use as a heat transfer medium, glycol is usually diluted with water, typically a 50–50 mixture being used. By reference to FIGS. 1 and 2, it can be seen that the replacement of some ethylene glycol (EG) with BLO results in a medium with a lower viscosity and, generally, a lower freezing point. Replacing from about 20 to 50 weight percent of glycol with BLO is preferred, and up to about 50 weight percent water is suitable for use herein.

One may, therefore, utilize a smaller proportion of organic materials in relation to water to achieve the freezing point, and also lower the viscosity of the resulting mixture.

As has been stated above, the utilization of glycols, especially EG, to prevent hydrate formation in natural gas processing is well known. Low temperature processing (i.e., below $-30°F.$) is becoming increasingly advantageous as the market for $C_2$ to $C_4$ aliphatic hydrocarbons grows.

FIG. 1 shows the dramatic improvement in viscosity which is realized when some EG is replaced with BLO. In said Figure, viscosity determinations were made for various ratios of $EG:BLO:H_2O$. It can be seen that even for the more aqueous solutions, replacement of about 15 percent of EG with BLO shows a 30 percent decrease in viscosity. All determinations for said Figure were made at $-40°F$.

Figure 2:
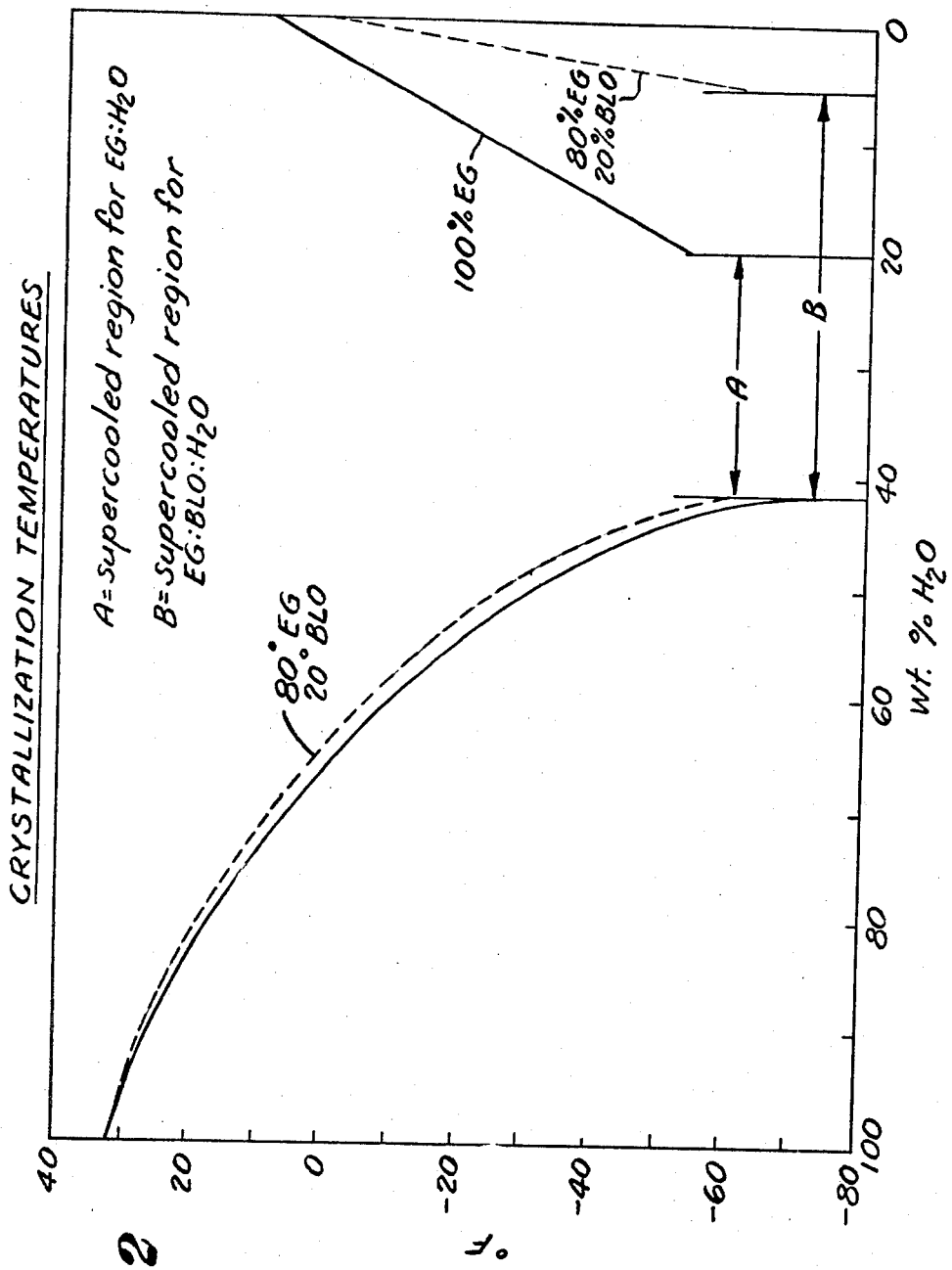

FIG. 2 shows the crystallization temperatures for various aqueous mixtures of EG alone and EG-BLO (80:20). It is significant to note that, at a given temperature, the utilization of as little as 20% BLO allows a much wider range of $H_2O$ to be used, thereby permitting more efficient gas drying operations.

For low temperatures, i.e., below about $-30°F.$, it is preferred to replace from about 15 to 35 weight percent of glycol with BLO. A weight percent ratio of glycol:BLO of about 70:30 is most preferred. Also, up to about 40 weight percent of water may optionally be used with the glycol-BLO mixture for this purpose.

The use of the combination of glycol and BLO, then, allows a gas plant operator to operate with a less aqueous solution of hydrate inhibitor, and, therefore, increase the water-dissolving capacity of said inhibitor.

Among those glycols which are suitable are ethylene glycol, diethylene glycol, triethylene glycol, propylene glycol, dipropylene glycol, tetraethylene glycol, and mixtures thereof. Ethylene glycol is preferred.

In order to demonstrate the ability of BLO to reduce the viscosity of glycols, the following comparisons were made at $-40°F.$, a weight percent ratio of glycol:BLO of 70:30 being used in all cases. Viscosity was measured in centistokes.

| Glycol | Viscosity 70:30 | 100% Glycol |
|---|---|---|
| Diethylene Glycol | 636 | 3000+ |
| Tetraethylene Glycol | 936 | 3000+ |
| Propylene Glycol | 1116 | 3000+ |

-Continued

| Glycol | Viscosity 70:30 | 100% Glycol |
|---|---|---|
| Dipropylene Glycol | 7284 (Pour point = −38° F.) | |

We claim:

1. In the process of cooling natural gas to remove the condensible fraction wherein a hydrate inhibitor is utilized, the improvement of utilizing as said inhibitor a mixture consisting essentially of at least one glycol selected from the group of ethylene glycol, diethylene glycol, propylene glycol, dipropylene glycol, triethylene glycol and tetraethylene glycol and butyrolactone in a weight ratio of 95:5 to 5:95, respectively.

2. The process of claim 1 wherein said inhibitor contains one or more glycols and butyrolactone in a weight ratio of 85:15 to 65:35.

3. The process of claim 2 wherein said inhibitor additionally contains up to about 40% $H_2O$.

4. The process of claim 2 wherein said ratio is about 70:30.

* * * * *